United States Patent [19] [11] 4,037,211
Ikuta et al. [45] July 19, 1977

[54] ADDRESS EXTENDING CONTROL UNIT

[75] Inventors: Hiroaki Ikuta, Yokohama; Yoshikazu Naruke, Kawasaki; Yoshio Nagasawa, Tokyo; Masanori Yakushi, Kawasaki, all of Japan

[73] Assignee: Panafacom Limited, Japan

[21] Appl. No.: 641,812

[22] Filed: Dec. 18, 1975

[30] Foreign Application Priority Data

Dec. 18, 1974 Japan .............................. 49-145417

[51] Int. Cl.² .............................................. G11C 8/00
[52] U.S. Cl. .................................................... 364/200
[58] Field of Search ..................................... 340/172.5

[56] References Cited

U.S. PATENT DOCUMENTS 3,938,096  2/1976  Brown ............................. 340/172.5
3,949,378  4/1976  Crabb .............................. 340/172.5

Primary Examiner—Gareth D. Shaw
Assistant Examiner—Thomas M. Heckler
Attorney, Agent, or Firm—Staas & Halsey

[57] ABSTRACT

An address extending control circuit is disclosed which is provided with a memory having a memory capacity larger than that assignable with the content of an address register. The memory area of the memory is divided into a common block and a plurality of segment blocks of variable capacity. In a certain processing, the common block and any one of the segment blocks are utilized in pairs, thereby to obtain an extended address. To this end, an address extending address register capable of selecting a predetermined segment block of the memory is provided in addition to the address register. When the value in the address register is detected to be larger than a predetermined value, the content of the address extending address register corresponding thereto is appended to the content of the address register to increase the number of bits and a combination of the common block with one segment block of the memory is selected, with which an address in the selected segment block is accessed. Thus, address extending can be achieved with a simple construction.

10 Claims, 8 Drawing Figures

1

ADDRESS EXTENDING CONTROL UNIT

BACKGROUND OF THE INVENTION

1. Field of the Invention

This invention relates to an address extending control unit, and more particularly to an address extending control unit for a data processing system which is provided with a memory having a memory capacity larger than that assignable with the content of an address register.

2. Description of the Prior Art

In the prior art, a data processing system employing a 16-bit address register is incapable of an address assignment of more than 64K and a usable main memory capacity is limited to 64K. Recently, however, there is a demand for increasing the capacity of the main memory by reason of speeding up of processing and easy programming. On the other hand, in the aspect of software, there is a demand for the employment of common software having no connection with the extending of the main memory capacity, that is, the problem of the so-called software compatibility.

To meet such demands, the method that has been proposed in connection with a data processing unit of, for example, 16 bits, is to extend the main memory capacity without increasing the bit number. Typical examples of this method are a base register method and a bank method. However, the former becomes heavy in terms of both hardware and software and this does not matter in large-sized machines but remains an unsettled problem in connection with medium- and small-sized machines. In the latter, since a physical memory area of the main memory is given in the unit of a bank, this method is not always practical from the viewpoint of actual operation of the data processing system.

SUMMARY OF THE INVENTION

This invention is to provide an address extending control unit which makes effective use of a memory having a memory capacity larger than that assignable with the content of an address register and is simple in construction and capable of rapid address extending in a short access time.

In accordance with this invention, the address extending control unit for a data processing system having a memory of a memory capacity larger than assignable with the content of an address register, comprises comparing means for comparing the content of the address register in magnitude with a settable predetermined value, an address extending address register capable of selecting a predetermined area of the memory in accordance with the predetermined value, and control means for making such a control that when the value in the address register is detected to be larger than the predetermined value, the content of the address extending address register corresponding thereto is appended to the content of the address register to obtain an increased number of bits, with which a predetermined address in a predetermined area of the memory is accessed.

DESCRIPTION OF THE PREFERRED EMBODIMENTS

This invention is designed to achieve address extension making effective use of the memory area of a main memory. That is, in view of the fact that the memory area of the main memory is generally divided into a supervisor area, a resident program area and a non-resident program area, the supervisor area, for example, is used as a common block and the resident and the non-resident program areas are divided into a plurality of segment blocks. In the distribution of given 16 bits to the common block and the segment blocks, the distribution ratio can be designated in accordance with the magnitude of the common block, by which the memory area of the main memory can be effectively utilized.

With reference to the drawings, the present invention will hereinafter be described.

Figure 1:
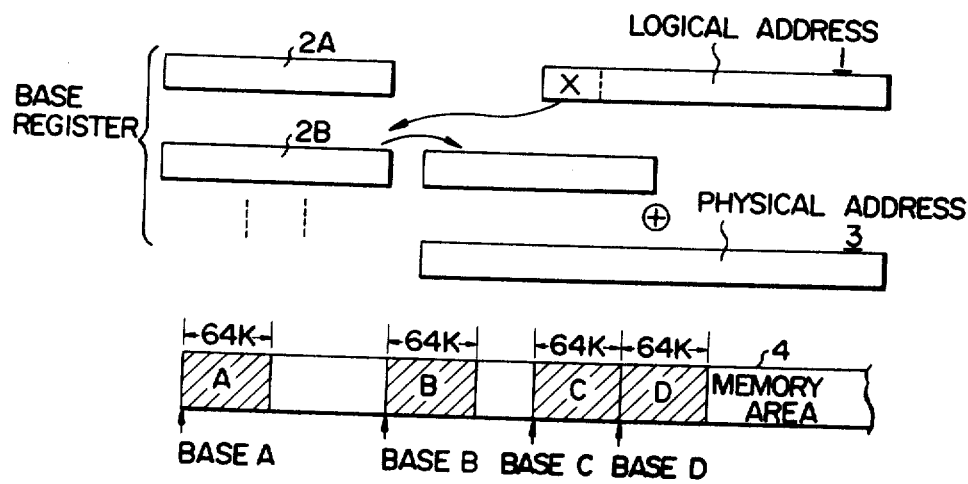
FIG. 1 is a diagrammatic representation for explaining the outline of a known base register method.

In FIG. 1, reference numeral 1 indicates a logical address; 2A, 2B, . . . designate base registers; 3 identifies a physical address; 4 denotes the memory area of a main memory; A, B, C and D represent areas in the cases of the base registers 2A, 2B, 2C and 2D being respectively designated; and X shows a base register designating part which is given onto the logical address.

In the case of the base register method, the base register designating part X is provided on the logical address 1 and, at the same time, the plurality of base registers 2A, 2B, . . . are provided which are designated by the base register designating part X. When the logical address 1 is given, one of the base registers, for example, 2B, is designated based on the content of the base register designating part X of the logical address 1 and the contents of the given logical address 1 and the designated base register 2B are operated, for example, added, by which the physical address 3 is determined. And, with the physical address 3 of the memory area 4 thus operated, the main memory is accessed.

The physical address 3 thus obtained bears such a relation to the memory area 4 that it corresponds to the memory areas A, B, C and D, respectively, when the base registers 2A, 2B, 2C and 2D are respectively designated.

This base register method differs in detail with the number of base registers used and so on but, in terms of hardware, it requires the provision of the base registers and control circuits therefor, which exerts influence on the addition of instructions, the processing speed, etc. In terms of software, this base register method requires complicated software such as data setting in the base registers, save and recovery of the contents of the base registers, etc. That is, the base register method is heavy both in hardware and in software. This does not offer any problem in large-sized machines but presents various problems in medium- and small-sized ones.

Figure 2:
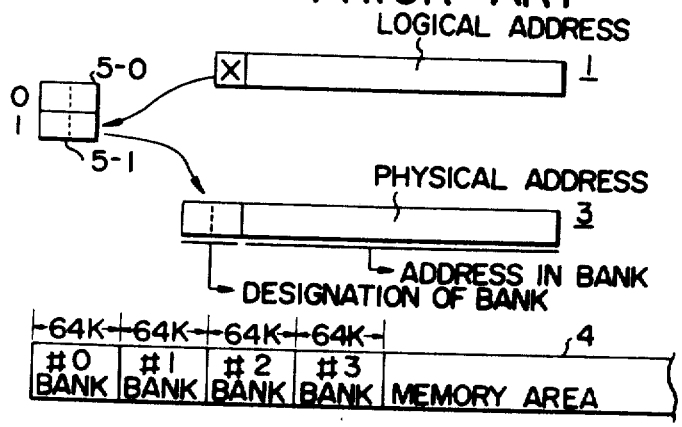
FIG. 2 is a diagrammatic representation, similar to FIG. 1, for explaining the outline of a known bank method.

In the bank method shown in FIG. 2, reference numerals 5-0 and 5-1 indicate bank designating registers and the other reference numerals correspond to those in FIG. 1.

In the case of the bank method, the register designating part X is provided on the logical address 1 and given 0 or 1. Where 1 is given, the content on the side of the register 5-1 is added to the logical address 1 to provide the physical address 3. And, in accordance with the bank designated information of the physical address 3, a No. 0 bank or a No. 3 bank is designated and, with an address in the bank, a specified address in the designated bank is accessed.

This method requires only to give the bank designated information for the determination of the physical address 3, and hence is relatively simple. However, since the area used in the course of a certain processing is given in the unit of a bank, this method is not always preferred, from the standpoint of actual operation of the data processing system.

Figure 3:
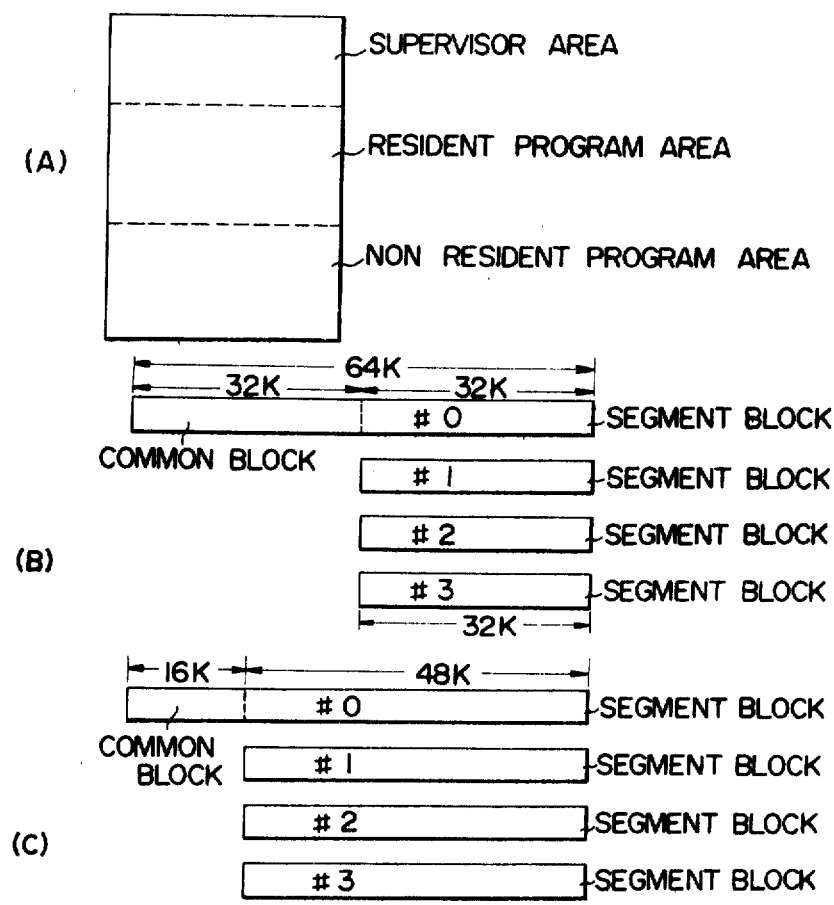
FIGS. 3A, B and C are diagrammatic representations for explaining the principles of the allocation of a memory area of a main memory according to this invention.

FIGS. 3A, B and C are explanatory of the principles of allocation of the memory area of a memory according to this invention. A shown in FIG. 3A, the area of a main memory is usually divided into a supervisor area, a resident program area and a non-resident program area. The supervisor area changes in magnitude with the number of input/output devices connected, the number of programs used, etc. and the resident program area also changes the number of its programs, its total capacity, etc. according to the system used. And the non-resident program area also changes the number of its levels, the number of its tasks, etc. according to the system used. Accordingly, even if the memory area of the main memory is extended, it is necessary to satisfy the above said requirements which change in accordance with the system employed.

To this end, in the present invention, for example, the supervisor area is used as a common block and the resident and non-resident program areas are divided into a plurality of segment blocks. And, in a certain processing, the common block and one segment block are used in conbination.

FIG. 3B shows the case where a memory area of 64K addresses accessible with given 16-bit address information is divided at an address 32K into a common block and segment blocks. And, any one of the No. 0, No. 1, . . . segment blocks is selected in accordance with the content of an extending address register EAR described later on. Whether given address information belongs to the common block or the segment block can be known from the most significant bit of the address information. FIG. 3C shows the case where the magnitude of the common block may be small. In this case, the memory area is divided at an address 16K into the common block and the segment blocks and when given address information is larger than the address 16K, address extending is achieved. It is determined in accordance with the content of the extending address register EAR which segment block is used.

As described above, in the present invention, the boundary between the common block and the segment blocks is variable with the magnitude of the common block. In the execution of a certain processing, a memory area corresponding to a certain segment block designated in accordance with the content of the extending address register and a memory area corresponding to the common block are regarded as if they exist in pairs on the main memory. Consequently, in the present invention, the memory area of the main memory can be assigned to the common block, the No. 0, No. 1, . . . segment blocks, so that the memory area can be effectively utilized, as compared with the conventional bank method in which the area corresponding to the common block is required to be provided for each bank for the purpose of decreasing the switching of banks during processing. Further, this invention has such an advantage that a change in the magnitude of the common block can be easily dealt with.

Figure 4:
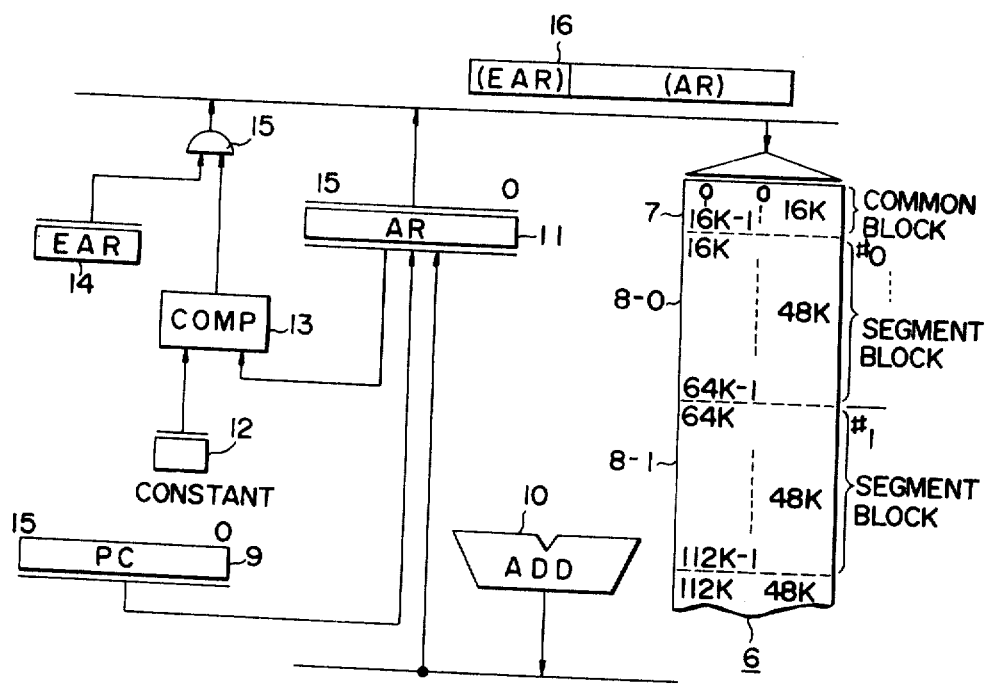
FIG. 4 is a block diagram illustrating one embodiment of an address extending control unit of this invention.

FIG. 4 illustrates one embodiment of this invention. In FIG. 4, reference numeral 6 indicates a main memory; 7 designates a memory area corresponding to the common block; 8-0, 8-1, . . . identify memory areas respectively corresponding to the No. 0, No. 1, . . . segment blocks; 9 represents a program counter; 10 denotes an arithmetic circuit; 11 shows, for example, a 16-bit address register; 12 refers to a constnt generator which generates a value corresponding to a maximum address of the memory area 7 corresponding to the common block, that is, a boundary address; 13 indicates a comparator which produces a logic 1 when the content of the register 11 is larger than the content of the constant generator 12; 14 represents an extending address register which designates either one of the No. 0 and No. 1 segment blocks; 15 identifies an AND circuit; and 16 denotes address information for practically accessing the main memory 6.

The assignment of the memory area in the main memory 6 corresponds to that shown in FIG. 3C.

For example, assuming that the common block 7 and the No. 1 segment block 8-1 of the main memory 6 are used during processing, "address information of the address 64K" is set in the extending address register 14 and the constant generator 12 provides "address information of the address 16K."

Let it be assumed that, under such conditions, address information corresponding to 16 bits is set in the address register 11 from the program counter 9 or the arithmetic circuit 10. The comparator 13 compares the content of the address register 11 and the value of the constant generator 12 with each other and produces a logic 1 when the former is larger than the latter. In this case, the content of the extending address register 14 is provided through the AND circuit 15 which is plural in practice. The content EAR of the extending address register 14 is added to the content AR of the address register 11 to provide the information 16, with which the main memory 6 is accessed. Since the content EAR is the address information of the address 64K as mentioned above, the area 8-1 is selected and one of the addresses of this area 8-1 is accessed in accordance with the content AR.

On the contrary, in the case where the content of the address register 11 is smaller than the value of the constant generator 12, the AND circuit 15 is held in the off state. Accordingly, 000 . . . 00 is set in that part of the information 16 in which the content of the extending address register 14 should be set. As a result of this, in the main memory 6, the area 7 is determined and a specific address in the area 7 is accessed with the content AR.

In usual processing in order to decrease the frequency of accessing the other segment blocks in the processing using the No. 1 segment block and the common block, the information to be stored in the respective segment blocks is distributed but, in the case where it becomes necessary to access another segment block, the content of the extending address register 14 is temporarily changed at that instant. Further, in the case where the magnitude of the common block is changed according to the specification of the particular computer system used, the value of the constant generator is altered and the magnitude of each segment block is also changed correspondingly.

Next, a detailed description will be given with regard to a concrete embodiment of the extending address register which is the principal part of the FIG. 4 embodiment of this invention and an address conversion system for address extending which employs the extending address register.

Figure 5:
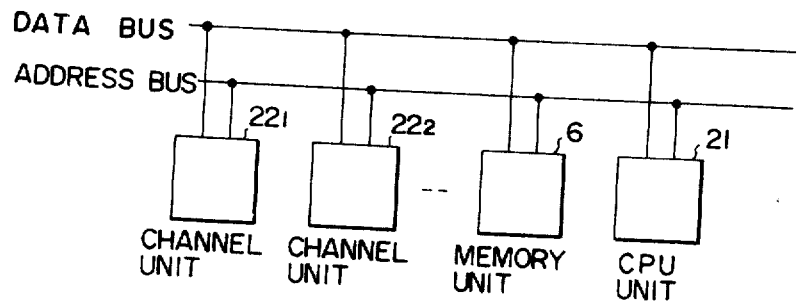
FIG. 5 is a system diagram illustrating another embodiment of this invention as being applied to a central processing unit and channel units.

FIG. 5 is a system diagram in the case where a central processing unit 21 and channel units $22_1$, $22_2$, . . . are connected in parallel with the memory 6 connected to the address bus in FIG. 4 and addresses are supplied together with data. In order to give the extending function to the central processing unit CPU and the channel units, the following two extending address registers EAR O and EAR 1 are employed.

Figure 6:
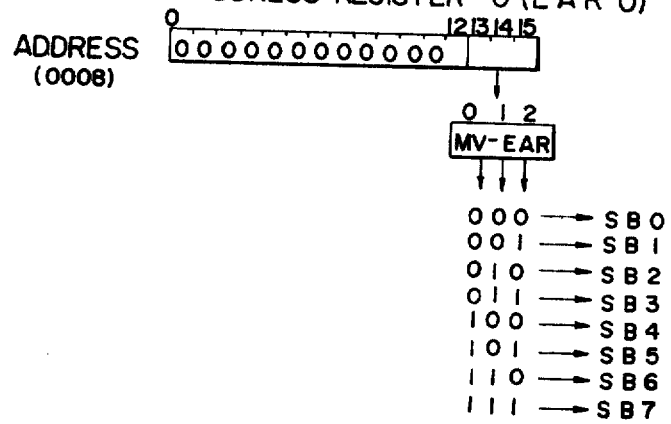
FIGS. 6 and 7 are diagrams for explaining the contents and functions of two kinds of address extending address registers of this invention.

FIG. 6 is an explanatory diagram showing the format of the extending address register 0 (EAR 0). This register is employed for the designation of another segment block based on a "MOVE IN instruction" and a "MOVE OUT instruction" for accessing another segment block from a segment block in operation and a "BRANCH OUT instruction" for effecting a branch to another segment block. This register is referred to as a moving extending address register (MV.EAR) after its mode of operation.

This register is capable of accessing in program. For example, it is at an address 0008 and the contents of the high order bits 0 to 12 of the 16 bits of read information are always 0 and the three low order bits are used as the bits 0, 1 and 2 of the moving extending address register (MV.EAR) and, in accordance with its content, segment blocks SB0 to SB7 are designated.

Figure 7:
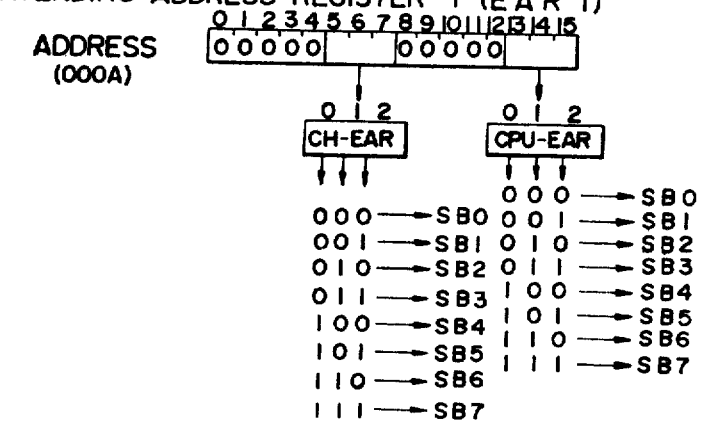

FIG. 7 is an explanatory diagram showing the format of the extending address register 1 (EAR 1). A channel extending address register (CH·EAR), which is designated by a high order byte, stores segment block (SB) designating information for accessing an address extended area from the channel unit. A central processing unit extending address register (CPU.EAP), which is designated by the low order byte, stores segment block (SB) designating information for accessing the address extended area from the central processing unit.

This register is capable of accessing in program. It is at an address 000A and the contents of bits 0 to 4 and 8 to 12 of the 16 bits of read information are always 0 and, in accordance with the content of the channel extending address register (CH·EAR), the segment blocks SB0 to SB7 are designated and, in accordance with the content of the central processing unit extending address register (CPU·EAR), the segment blocks SB0 to SB7 are designated.

By the use of such two kinds of extending address registers described above, the following address conversion is achieved.

Figure 8:
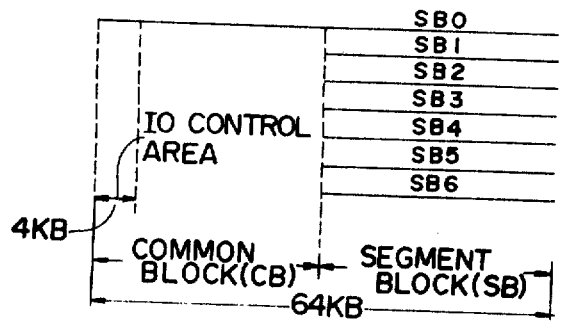
FIG. 8 is a diagram for explaining the address extending operations in the cases of employing the address extending address registers, respectively.

For the address conversion of the central processing unit (CPU), a logical address space of 64K bytes expressed by 16 bits, is divided into a common block including a 4K-byte input/output control area and segment blocks, as shown in FIG. 8. Where the logical address exists in the common block, it becomes a physical address as it is. Where the logical address is in the segment block, it is added with the content of the central processing unit extending address register (3 bits) of the extending address register (EAR 1) for segment designation to provide a physical address represented with 19 bits, with which the main memory is accessed.

The address conversion of the channel unit is achieved in the following manner. That is, in the case where the central processing unit accesses the channel unit, the content of the channel extending address register (CH·EAR) (3 bits) of the extending address register (EAR 1) is sent out and a segment, which is direct-memory accessed, is stored on the side of the channel unit, by which the address conversion is performed.

To say more precisely, not only in the case of the central processing unit accessing the channel unit but also in the case of the channel unit accessing the central processing unit or the memory, it is necessary that the central processing unit make a predetermined preparation by using the information in the input/output control area of the memory prior to the accessing. Accordingly, when accessing from the central processing unit to the memory is achieved with respect to the input/output control area of 4K bytes shown in FIG. 8, the central processing unit automatically adds the channel extending address register (extending address information) in the register (EAR 1) (shown in FIG. 7) to the logical address at its high order to provide a 19-bit address, which is sent out to the channel unit.

The channel unit sets in its memory address register a data and, at the same time, the content of the channel extending address register (CH·EAR), too. Thereafter, transfer of information by direct memory access is achieved with the use of an address (19 bits) added with the content of the channel extending address register (CH.EAR).

In the case of an access to an area other than the input/output control area, if the logical address designating the object of the access is outside of the input/output control area, the central processing unit automatically adds the content of the central processing unit extending address register (CPU.EAR) (extending address information) (shown in FIG. 7) of the register EAR 1 to the logical address at ites high order to obtain a semi-logical address of 19 bits.

In a memory access control unit, when addresses from the central processing unit and the channel unit designate the common block, the information of the extending address register is ignored.

That is, in this embodiment, unlike in the FIG. 4 embodiment, the contents of the extending address registers MV·EAR, CH·EAR and CPU·EAR are always sent out to the address bus together with the logical address regardless of its magnitude. And the decision of the magnitude of the logical address is achieved on the side of the memory. Namely, when the logical address is larger than a predetermined address, the memory is accessed with the use of the contents of the extending address registers (EAR) sent out together with the logical address. When the logical address is smaller than the predetermined address, the extending address registers are masked to be 000 and then the memory is accessed. Such a system is of particular utility when employed in the system in which a common bus is connected to various units, that is, the central processing unit, the memory and the channels are connected in common.

It will be apparent that many modifications and variations may be effected without departing from the scope of the novel concepts of this invention.

What is claimed is:

1. In a data processing system provided with an address register having a content of fixed number of bits and a memory having a memory storage area larger than the storage area addressable with the content of said address register; an address extending control unit for enabling the addressing of a predetermined address in a predetermined area of said memory, as selectively indicated by a corresponding data input to said control unit, said control unit comprising:

comparing means connected to said address register for comparing the content thereof in magnitude with a settable predetermined value and for providing an output signal when the content of said address register is larger than said settable predetermined value;

an address extending address register responsive to said corresponding data input to said control unit for holding a content indicating said selected predetermined area of the memory; and control means connected to said address register, said comparing means and said address extending register, and responsive to said output signal for appending the content of the address extending address register to the content of the address register so as to provide as a control output an increased number of bits greater than said fixed number, whereby said predetermined address in said predetermined area of the memory is selected.

2. In the data processing system according to claim 1, wherein the memory storage area of the memory corresponding to the address register comprises a common block and at least one segment block; and wherein said common block and a chosen one of said segment blocks are selected by means of said control output provided by said control means.

3. In the data processing system according to claim 2, wherein when the value in the address register is larger than the predetermined value, a desired segment block is selected in accordance with the content of the address extending address register.

4. In the data processing system according to claim 2, wherein said data processing system includes a central processing unit and a channel unit, and wherein first and second chosen segment blocks are selected for access by said central processing unit and channel unit, respectively, wherein the address extending address register includes a channel extending address portion for accessing said second chosen one of said segment blocks said channel unit and a central processing unit extending address portion for accessing said first chosen one of said segment blocks from said central processing unit.

5. In the data processing system according to claim 3, wherein said data processing system issues a transfer instruction to cause cessation of addressing of a currently addressed operational segment block and start of addressing of another segment block, wherein the address extending address register includes a moving extending address portion for accessing said another segment block from the operating segment block.

6. In a data processing system having a memory which includes a common block and a plurality of segment blocks, and an address register having a content of fixed length first number of bits which may assume any value up to a maximum value so as to address any corresponding location in a desired area of said memory, said common block having a maximum addressability which defines a predetermined settable value, and a chosen one of said segment blocks being designated by a predetermined extension address provided by said data processing system; an address extending control unit for addressing the entirety of the capacity of said memory, comprising in combination:

comparing means connected to said address register for comparing the content thereof with said predetermined settable value and for producing a given output when the content of said address register is greater than said predetermined settable value; and further means connected to said address register and to said comparing means, and responsive to said given output for appending said predetermined extension address corresponding to said chosen one of said segment blocks to the content of said address register so as to obtain an extended-length address of length greater than said fixed length whereby to enable access of said chosen one of said segment blocks in said memory.

7. In a data processing system as recited in claim 6, comprising a generator means for generating said predetermined settable value.

8. In a data processing system as recited in claim 6, including output means connected to said address register and to said further means, and wherein said further means comprises an extended address register means of second fixed number of bits for holding said selected one of said predetermined extension addresses, said output means including a plurality of outputs equal to the sum of said first and second number of bits; and AND gate means connected between said extended address register means and said output means, and responsive to said comparing means for passing said selected one of said predetermined extension addresses to said output means when said comparing means produces said given output whereby to obtain said extended-length address in said output means.

9. In a data processing system as recited in claim 7, wherein said extension address register means comprises a moving extending address portion for holding a plurality of bits designating a segment block to be accessed from a segment block already being accessed.

10. In a data processing system as recited in claim 7, wherein said data processing system comprises at least one channel unit and a central processing unit, and said extended address register means includes a channel-extended address portion for holding a first plurality of bits designating a segment block to be accessed from said at least one channel unit, and a central processing unit extended-address portion for holding a second plurality of bits designating a segment block to be accessed from said central processing unit.

* * * * *

UNITED STATES PATENT OFFICE
CERTIFICATE OF CORRECTION

Patent No. 4,037,211          Dated July 19, 1977

Inventor(s) Hiroaki Ikuta et al

It is certified that error appears in the above-identified patent and that said Letters Patent are hereby corrected as shown below:

Column 3, line 25, change "A" to --As--.
Column 5, line 32, change "(MV.EAR)" to --(MV·EAR)--.
Column 6, line 37, change "(CH.EAR)" to --(CH·EAR)--.
Column 6, line 47, change "ites" to --its--.

Signed and Sealed this

Fifteenth Day of November 1977

[SEAL]

Attest:

RUTH C. MASON
*Attesting Officer*

LUTRELLE F. PARKER
*Acting Commissioner of Patents and Trademarks*